Dec. 30, 1924.
L. W. CHUBB
RECORDING METER
Filed Jan. 20, 1921
1,521,007
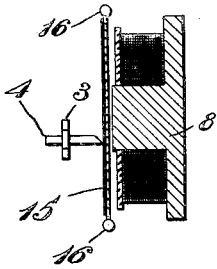
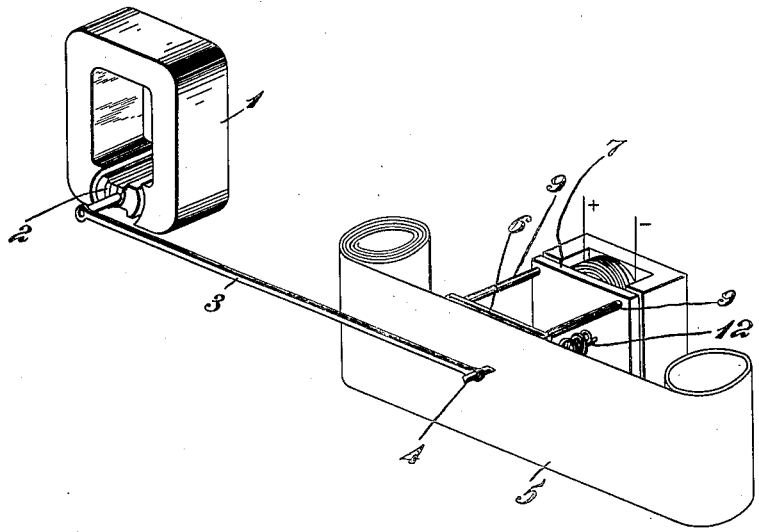
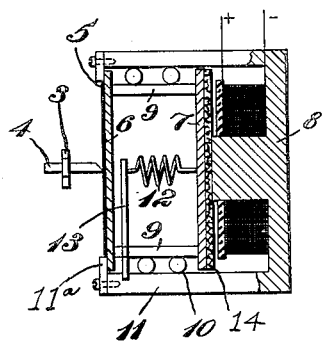
WITNESSES:
INVENTOR
Lewis Warrington Chubb.
BY
Wesley G. Carr
ATTORNEY Patented Dec. 30, 1924.

1,521,007

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

RECORDING METER.

Application filed January 20, 1921. Serial No. 438,585.

*To all whom it may concern:*

Be it known that I, LEWIS WARRINGTON CHUBB, a citizen of the United States, and a resident of Edgewood Park, in the county of Allegheny and State of Pennsylvania, have invented a new and useful Improvement in Recording Meters, of which the following is a specification.

My invention relates to meters and it has particular relation to meters adapted to graphically record the amount of the force measured thereby by means of a movable stylus.

One of the objects of my invention is to provide a device of the character described that shall be efficient in operation and simple in construction and one that may be manufactured at a relatively small expense.

Heretofore, in devices of this general character, it has been observed that the friction of the stylus upon the record sheet retards the movement thereof to such an extent as to materially interfere with an accurate recording of the force exerted.

To obviate this difficulty, various auxiliary means, such as motors and springs, have been devised to actuate the stylus in accordance with the indication of the meter. Devices of this character are expensive and not satisfactory by reason of the fact that the accuracy of the meter is impaired.

I have discovered that the friction between one body moving upon another body may easily be overcome by vibrating one of the bodies in a direction transverse to that of the path of relative movement of said bodies. The friction between the bodies, having been thus reduced to a minimum, the only force required to move the body is that necessary to overcome the inertia thereof.

By applying this principle to recording meters, I have devised a structure in which the friction between the stylus and the record sheet is materially reduced, by providing a platen which is adapted to be rapidly vibrated.

In the accompanying drawings:

Figure 1 is a perspective view of a recording meter constructed in accordance with my invention.

Fig. 2 is a side view, partially in elevation and partially in section, of the device shown in Fig. 1.

Fig. 3 is a view, similar to Fig. 2, illustrating a further embodiment of my invention.

Referring to the drawing, a meter element, of any preferred type or construction, is shown as comprising a stationary magnetizable member 1 and a movable armature 2. An arm 3 is suitably secured to the armature 2 and is provided with a stylus 4 adjacent to the extremity thereof for cooperation with a record sheet or chart 5. The arm 3 preferably maintains the stylus in yieldable contact with the chart 5.

The sheet 5 is fed, in any preferred manner, across the face of a movable platen 6 which is connected to an armature 7 of an electromagnet 8 by means of transverse members or rods 9. The platen 6 and armature 7 are movably mounted in any preferred manner but, for the purpose of illustration, are shown as disposed between anti-friction rollers 10 carried by frame members 11 which also constitute a support for the electromagnet 8. The extremities of the members 11 adjacent to the platen 6 are provided with stops 11$^a$ which are adapted to limit the outward movement of the platen.

A spring 12, one end of which is secured to the armature 7 and the other end of which is secured to a suitable bracket 13, normally tends to maintain the platen 6 and record sheet 5 in engagement with the stylus 4 and spaced from the core of the magnet 8. A pad 14, of any suitable and relatively resilient material, may be disposed between the armature 7 and the magnet 8.

The electromagnet 8 is adapted to be energized by an alternating current or by a pulsating unidirectional current which causes the same to intermittently attract the armature 7 against the action of the spring 12 and the resilient pad 14. When the cycle of an alternating current passes through the zero points or when a direct current ceases to attract during the interval between the pulsations thereof, the spring 12 draws the armature out of engagement with the magnet 8 and forces the platen 6 and the record sheet 5 into engagement with the stylus 4.

In Fig. 3, I have shown the magnet 8 as being provided with an armature which comprises a diaphragm 15 mounted, at each end, upon pins 16. The diaphragm 15 also constitutes the platen over which the chart 5 is adapted to be moved. The intermittent energization of the magnet 8 causes the diaphragm 15 to vibrate very rapidly, thus minimizing the friction between the stylus and the chart.

It will be apparent that the intermittent excitation of the magnet 8 occurs very rapidly and causes the armature and platen 6 to vibrate at a corresponding speed and thus to substantially eliminate the friction between the record sheet and the stylus. Moreover, it will be obvious that the chart may be vibrated in its own plane or the stylus may be vibrated to accomplish the desired results.

By means of my invention, the proper degree of oscillatory movement my be obtained to reduce the friction between the stylus and the paper by merely controlling the character and amount of the current employed to energize the magnet and, at the same time, ensure avoidance of the disadvantages heretofore encountered.

I claim as my invention:

1. The combination with a record chart and a relatively movable recording stylus for engagement with a plane surface thereof, of means for compensating for friction between the chart and stylus comprising means for rapidly vibrating said plane surface in directions normal to its plane.

2. The combination with a record chart, a platen having a plane surface for supporting a portion of the chart and a stylus for engagement with the chart over said plane surface, of means for compensating for friction between the chart and stylus comprising means for rapidly vibrating the platen to move said surface in directions normal to its plane.

3. The combination with a record chart and a relatively movable recording stylus for engagement with a plane-surface portion thereof, of means for compensating for friction between the chart and stylus comprising means for rapidly vibrating said plane-surface portion in directions normal to the plane thereof at every point on its surface.

4. The combination with a record chart and a recording stylus adapted to engage the chart and to describe an arcuate path thereover, of means for compensating for friction between the chart and stylus comprising means for accurately maintaining a portion of the chart opposite the stylus in a plane parallel to the plane of travel of the stylus and for rapidly vibrating said plane chart portion in directions normal to its plane at every point on its surface opposite the path of travel of the stylus.

5. The combination with a record chart and a relatively movable recording stylus for engagement with a plane-surface portion thereof, of means for compensating for friction between the chart and stylus comprising a platen having a plane surface disposed in adjacent parallelism to the plane surface of the chart behind the latter, said platen being movable in directions normal to said plane surfaces, bearing means for the platen constructed and related thereto to maintain the plane surface thereof in accurate parallelism to the plane surface of the chart and means for rapidly vibrating the platen.

6. The combination with a record chart and a relatively movable recording stylus for engagement with a plane surface portion thereof, of means for compensating for friction between the chart and stylus comprising a platen having a plane surface disposed in adjacent parallelism to the plane surface of the chart behind the latter, said platen being movable in directions normal to said plane surfaces, a plurality of relatively widely separated bearing means for the platen adapted to maintain the plane surface thereof in accurate parallelism to the plane surface of the chart and means for rapidly vibrating the platen.

7. The combination with a longitudinal movable record strip and a stylus laterally movable thereon, of means for compensating for friction between the strip and the stylus comprising a plate behind the strip opposite the path of travel of the stylus, means for supporting the plate at relatively widely separated points to maintain the same in accurate parallelism to the plane of the record strip and means for rapidly vibrating the plate in directions normal to said plane.

8. The combination with a longitudinally movable record strip and a stylus laterally movable thereon, of means for compensating for friction between the strip and the stylus comprising a plate behind the strip opposite the path of travel of the stylus, means projecting rearwardly from the plate normal to the plane thereof, bearing means for said projecting means, and means for rapidly vibrating the plate and moving said projecting means relative to the bearing means.

In testimony whereof, I have hereunto subscribed my name this 11th day of January, 1921.

LEWIS WARRINGTON CHUBB.